United States Patent
Weβ et al.

(10) Patent No.: US 9,126,498 B2
(45) Date of Patent: Sep. 8, 2015

(54) METHOD AND SYSTEM FOR DISTRIBUTING A RECUPERATION FOR A VEHICLE

(71) Applicant: VOLKSWAGEN AG, Wolfsburg (DE)

(72) Inventors: Alexander Weβ, Wolfsburg (DE); Hendrik Schröder, Braunschweig (DE)

(73) Assignee: VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 14/299,769

(22) Filed: Jun. 9, 2014

(65) Prior Publication Data
US 2014/0365075 A1 Dec. 11, 2014

(30) Foreign Application Priority Data
Jun. 10, 2013 (DE) .......................... 10 2013 009 732

(51) Int. Cl.
| | |
|---|---|
| B60R 16/03 | (2006.01) |
| B60L 11/18 | (2006.01) |
| B60W 30/18 | (2012.01) |
| H02J 1/14 | (2006.01) |
| B60L 1/00 | (2006.01) |
| B60L 1/08 | (2006.01) |
| B60L 7/18 | (2006.01) |
| B60L 7/22 | (2006.01) |

(52) U.S. Cl.
CPC .............. *B60L 11/1872* (2013.01); *B60L 1/003* (2013.01); *B60L 1/08* (2013.01); *B60L 7/18* (2013.01); *B60L 7/22* (2013.01); *B60L 11/1859* (2013.01); *B60L 11/1862* (2013.01); *B60W 30/18127* (2013.01); *H02J 1/14* (2013.01); *B60L 2240/34* (2013.01); *B60L 2240/545* (2013.01); *B60L 2250/26* (2013.01)

(58) Field of Classification Search
USPC .......................................................... 701/36
See application file for complete search history.

(56) References Cited

U.S. PATENT DOCUMENTS

| | | | |
|---|---|---|---|
| 6,208,931 B1 * | 3/2001 | Schoettle et al. ............. | 701/115 |
| 6,441,574 B1 * | 8/2002 | Phillips et al. ................ | 318/432 |
| 6,925,369 B2 * | 8/2005 | Obayashi et al. ............. | 701/36 |
| 7,525,279 B2 * | 4/2009 | Breen ........................... | 320/104 |
| 7,590,477 B2 * | 9/2009 | Loeffler ......................... | 701/36 |

(Continued)

FOREIGN PATENT DOCUMENTS

| | | |
|---|---|---|
| DE | 102006026404 A1 | 12/2007 |
| DE | 102009034180 A1 | 2/2011 |

(Continued)

OTHER PUBLICATIONS

Search Report for German Patent Application No. 10 2013 009 732.0; Jan. 27, 2014.

*Primary Examiner* — Thomas Tarcza
*Assistant Examiner* — Alex C Dunn
(74) *Attorney, Agent, or Firm* — Barnes & Thornburg LLP

(57) ABSTRACT

A method to distribute recuperation power for a vehicle including determining the recuperation power, detecting a respective setpoint power of at least one energy consumer, distributing the recuperation power to electrical energy sinks, which comprise an energy store and the at least one energy consumer, depending on the respective setpoint power of the at least one energy consumer, to the energy sinks such that an average actual power of the at least one energy consumer corresponds to the respective setpoint power of the at least one energy consumer.

9 Claims, 4 Drawing Sheets

(56) References Cited

U.S. PATENT DOCUMENTS

| | | | |
|---|---|---|---|
| 7,812,468 B2 * | 10/2010 | Kuroda et al. | 290/40 C |
| 8,069,940 B2 * | 12/2011 | Nenno et al. | 180/65.21 |
| 8,269,641 B2 * | 9/2012 | Bauman et al. | 340/636.1 |
| 2005/0189894 A1 * | 9/2005 | Komiyama et al. | 318/376 |
| 2005/0246082 A1 * | 11/2005 | Miki et al. | 701/50 |
| 2007/0213921 A1 * | 9/2007 | Yamaguchi | 701/115 |
| 2009/0044996 A1 * | 2/2009 | Frank | 180/65.29 |
| 2009/0093921 A1 * | 4/2009 | Falkenstein | 701/22 |

FOREIGN PATENT DOCUMENTS

| | | |
|---|---|---|
| DE | 102012004008 A1 | 9/2012 |
| DE | 102011017678 A1 | 10/2012 |
| DE | 102012209202 A1 | 12/2012 |
| JP | 2005176484 A | 6/2005 |

* cited by examiner

METHOD AND SYSTEM FOR DISTRIBUTING A RECUPERATION FOR A VEHICLE

PRIORITY CLAIM

This patent application claims priority to German Patent Application No. 10 2013 009 732.0, filed 10 Jun. 2013, the disclosure of which is incorporated herein by reference in its entirety.

SUMMARY

Illustrative embodiments relate to a method and to a system to distribute power, which is produced in the event of recuperation by a vehicle, between energy sinks of the vehicle.

BRIEF DESCRIPTION OF THE DRAWINGS

The present invention will be described in detail below using disclosed embodiments with reference to the figures.

DETAILED DESCRIPTION OF THE DISCLOSED EMBODIMENTS

Figure 1:
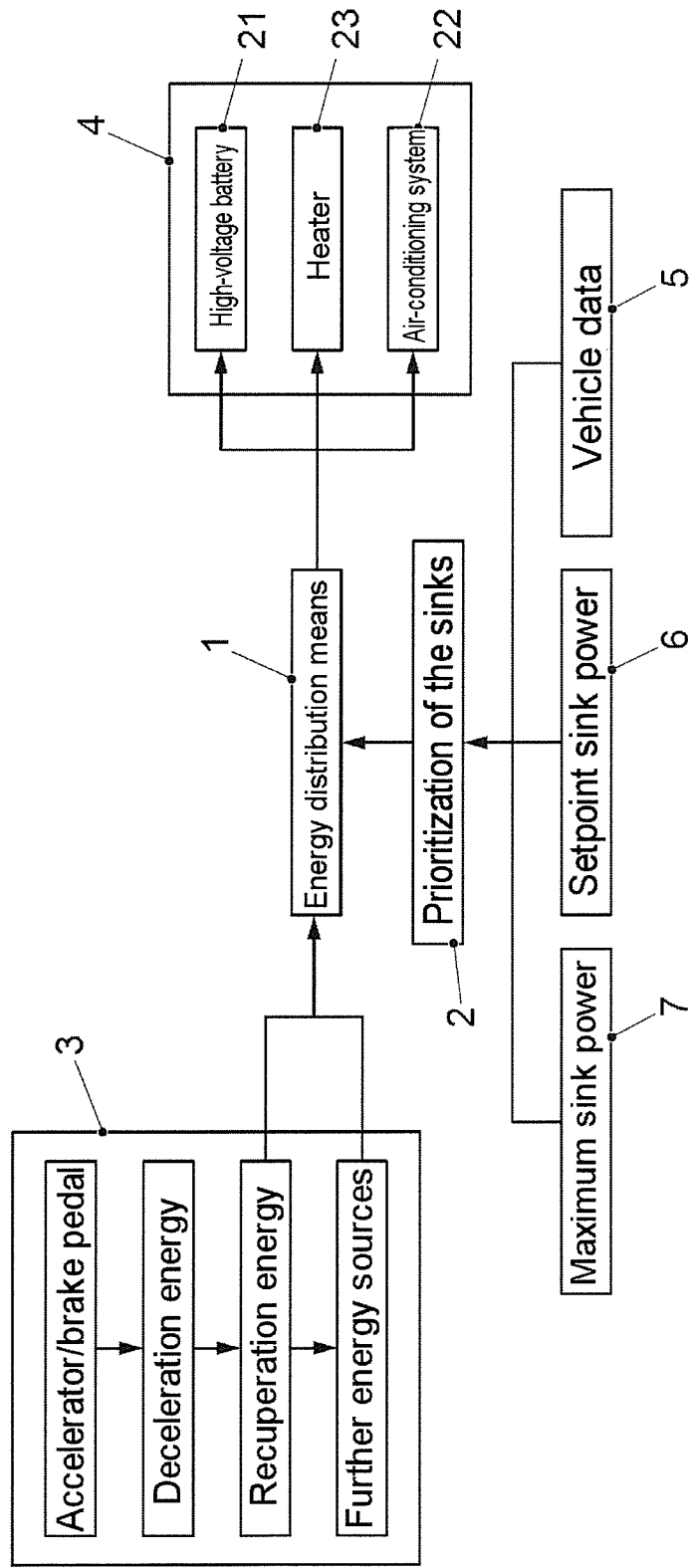
FIG. 1 schematically shows the present invention.

Disclosed embodiments provide a method for distributing recuperation power for a vehicle. The method comprises determining the recuperation power, which includes determining the amount of recuperation power available from the vehicle. In this case, the recuperation power comprises, in particular, the recuperation power of all reversible energy converters, these including, for example, a thermoelectric generator, in addition to electric motors. In other words, the currently maximum available recuperation power which is intended to be distributed to energy sinks is determined, in particular, depending on a position of the brake pedal;

The method further comprises detecting a respective setpoint power of one or more electrical energy consumers of the vehicle. In this case, each energy consumer ascertains the setpoint power, that is to say that power which is intended to be supplied to the respective energy consumer;

The method further comprises distributing the recuperation power to electrical energy sinks of the vehicle, in particular by adjusting the setpoint powers of the electrical energy consumers. In this case, the electrical energy sinks comprise an energy store of the vehicle and the energy consumer or consumers. In this case, distribution of the recuperation power to the energy sinks is carried out depending on the respective setpoint power of the energy consumer or consumers in such a way that the average actual power of the energy consumer or consumers corresponds to the respective setpoint power of the energy consumer or consumers.

Since the recuperation power can be supplied not only to the energy store, but also to energy consumers of the vehicle, it is advantageously ensured that the recuperation power is used in an expedient manner at all times. If, for example, the state of charge of the energy store indicates that it is currently not possible to temporarily store all of the available recuperation power in the energy store, at least some of the recuperation power can be distributed to electrical energy consumers of the vehicle. To then ensure that only the actual power of the respective consumer is temporarily increased above the corresponding setpoint power as a result, the adjusted setpoint power is, in particular, subsequently (for example immediately after or a predetermined period of time after the end of the recuperation mode of the vehicle) temporarily reduced in such a way that the energy which was previously excessively supplied to the respective consumer is saved again.

In this case, prioritization of the energy sinks is performed in particular to distribute the recuperation power to the energy sinks on the basis of this prioritization. In this case, the prioritization depends on:

an external temperature. For example, the lower the external temperature, the more the prioritization of an interior heating device can be increased. In a similar way, the higher the external temperature, the higher the prioritization of an interior cooling device can be;

system temperatures. In this case, a system temperature is to be understood to mean, for example, the temperature of the energy store or the temperature of the interior of the vehicle. At a low external temperature (that is to say the external temperature lies below a predetermined temperature threshold value), the further below the setpoint value the interior temperature lies, the higher the priority advantageously given to a heating device of the vehicle as an energy sink. In a similar way, at a high external temperature (that is to say the external temperature lies above a predetermined temperature threshold value), the further above the setpoint value the interior temperature lies, the higher the priority given to an air-conditioning system as an energy sink;

a state of charge of the energy store. In particular, the lower the state of charge of the energy store, the higher the prioritization of the energy store;

a degree of efficiency of the energy sinks. If the energy sink is an electrical consumer, the degree of efficiency of the energy sink indicates what proportion of the electrical energy is converted into another form of energy (for example heat or cold). If the energy sink is an energy store, the degree of efficiency indicates what proportion of the energy which is supplied to the energy store for storage purposes is available from the energy store again in the event of discharging. In this case, the higher the direct degree of efficiency (that is to say without previous energy storage) of this energy sink, in particular in comparison to a degree of efficiency chain which takes into account temporary storage of the energy in an energy store before the conversion of the energy in the energy sink, the higher the prioritization of the respective energy sink.

Since the recuperation power is distributed depending on the prioritization of the respective energy sinks, it is advantageously ensured that the available recuperation power is used as efficiently as possible.

It may be possible for at least one of the energy consumers to be intermittently supplied with the available recuperation power. To this end, the corresponding energy consumer is periodically not activated or switched on at all for a time period and is switched on for the remainder of the duration, with the result that the power which is consumed in the switched-on state corresponds to its maximum power consumption or, better, its power consumption which is optimized in respect of the degree of efficiency. In this case, the power consumption by a respective consumer which is optimized in respect of the degree of efficiency is to be understood to mean that power consumption at which the respective consumer exhibits its best degree of efficiency.

Owing to this intermittent operation, a poor partial-load degree of efficiency of the energy consumer can advantageously be avoided. Intermittent operation of this kind is also feasible over the entire distance of travel, that is to say also in operating phases of the vehicle in which no recuperation power is generated.

In at least one disclosed embodiment, a distance of travel which is intended to be traveled by the vehicle in the future is determined by a navigation system. In this case, the recuperation power is distributed to the energy sinks depending on this predetermined distance of travel.

It is possible to use the distance of travel which is intended to be traveled by the vehicle in the future to determine when a recuperation power is generated and what the magnitude of this recuperation power will be, to distribute the recuperation power to the energy sinks depending on this time and the amount of recuperation power.

According to the disclosed embodiments, the recuperation power can also be distributed in such a way that a charging power or a charge current of the energy store is kept below a threshold value which itself lies below the maximum possible charging power or the maximum possible charge current.

Since the charging power or the charge current is limited, undesired peaks can be advantageously avoided, this counteracting, for example, aging of the energy store (for example of the battery).

Since the maximum available recuperation power is always distributed to the energy sinks as far as possible, the brake pedal feel can be kept constant. This applies particularly when the braking action is realized by an electric motor operating as a generator. In contrast, the brake pedal feel would not be able to be kept constant if the energy store was excessively charged and therefore no recuperation energy or only a relatively small proportion of the recuperation energy could be accepted.

If the available recuperation energy is not sufficient to supply the energy consumers, the energy consumers are supplied, in particular, with energy from the energy store.

It goes without saying that it is further also possible to supply the energy consumer or consumers by means of other energy sources, for example by means of an internal combustion engine with a generator.

According to another disclosed embodiment, the discharge current of the energy store is always kept below a predetermined threshold value, which itself in turn lies below the maximum discharge current of the energy store, as far as possible. To achieve this objective, some energy consumers can be operated with a reduced setpoint power, for example in phases with a high drive power.

Since the discharge current of the energy store is also always kept below the predetermined threshold value even in full-load traction phases or else in partial-load traction phases of the vehicle, high discharge currents of the energy store which have a particularly adverse effect on the stability of the energy store can be avoided.

To keep the discharge current below the predetermined threshold value, the power which is supplied to the energy consumers can, as a variant, be lowered to zero or lowered at least to below the respective setpoint power of the consumer in full-load traction phases of the vehicle, to provide a relatively large proportion of the discharge current for the drive.

Furthermore, it is possible to detect the temperature of the energy store, and the power which is requested by a drive motor of the vehicle. The discharge current of the energy store can then be set higher than would actually correspond to the power which is requested by the drive motor if the detected temperature lies below a predetermined temperature threshold value. In this case, the energy consumers can be driven with a higher setpoint power, this then leading to the higher discharge current of the energy store, as a result of which the energy store is heated.

As a result, the energy store can advantageously be heated with a correspondingly high discharge current when this is necessary (since the temperature of the energy store lies below the temperature threshold value). Since an excessively cold energy store permits only small charge current and also discharge current, heating up the energy store as rapidly as possible ensures that more recuperation energy can be accepted by the energy store in subsequent recuperation phases.

Conversely, in the case of a very warm energy store (that is to say the temperature of the energy store lies above a further temperature threshold value), a relatively large proportion of the recuperation power can be distributed to the energy consumers (for example by the energy consumers being driven with a relatively high setpoint power) to avoid further heating of the energy store. As a variant, the threshold value below which the charge current of the energy store is intended to be kept can also be lowered as the temperature of the energy store rises as soon as the temperature of the energy store lies above the further temperature threshold value.

A system for distributing a recuperation power for a vehicle is also provided. In this case, the system comprises a control means and a plurality of electrical energy sinks. The energy sinks firstly comprise an energy store of the vehicle and secondly one or more energy consumers of the vehicle. The control means is designed to determine a recuperation power, to detect a respective setpoint power of the energy consumer or consumers, and to distribute the recuperation power to the energy sinks depending on the respective setpoint power of the energy consumer or consumers in such a way that an average actual power of the energy consumer or consumers corresponds to the respective setpoint power of the energy consumer or consumers.

The system according to the disclosed embodiments substantially corresponds to the advantages of the method, which advantages are discussed in detail above and therefore are not repeated here.

Finally, a vehicle which comprises a system is also provided.

Disclosed embodiments prevent the maximum charging power of the battery from lying at a low level over the long term on account of the high states of charge or low temperatures of the battery. Furthermore, disclosed embodiments make it possible for more recuperation energy than can be accepted by the battery to be used, this being of interest particularly when using electrical brake boosters.

The disclosed embodiments can be used to increase the range of a vehicle, in particular under cold or very warm environmental conditions. Furthermore, comfort can be increased owing to a brake pedal feel which remains the same, as can the degree of efficiency of the vehicle.

In summary, disclosed embodiments provide maximum exhaustion of the recuperation power; a reproducible brake pedal response; no restriction of the drive power, for example in the event of full-load journeys, by electrical consumers; efficient operation of the electrical consumers by avoiding partial-load operation; the temperature of the energy store (for example of a battery) is kept within a specific temperature range; and the service life of the energy store is extended by peaks of the charge current or of the discharge current being avoided.

The disclosed embodiments are particularly suitable for use in motor vehicles. The present invention is not restricted to the disclosed field of application since the present invention can also be used in ships, aircraft and also rail-bound or track-guided vehicles.

The disclosed embodiments are intended to be explained by way of example in the text which follows.

The driver of an electric vehicle sets a desired deceleration by means of a brake pedal of the electric vehicle. A maximum recuperation power (for example 30 kW) is determined on the basis of the desired deceleration. The battery of the electric vehicle has a maximum charging power of 20 kW, and an electrical heater of the electric vehicle has a maximum power of 20 kW, with 5 kW currently being converted into thermal energy in the heater.

For a first disclosed embodiment, it is assumed that the state of charge of the battery is low. In this case, the priority of the high-voltage battery is graded higher than the priority of the heater. Therefore, a maximum proportion of the recuperation power (in this case 20 kW) is supplied to the high-voltage battery. The remaining proportion of the recuperation power of 10 kW (instead of the 5 kW) is supplied to the heater.

For a second disclosed embodiment, it is assumed that the state of charge of the battery is high and, at the same time, a low external and interior temperature prevails. In this case, the priority of the heater is graded higher than the priority of the high-voltage battery. Therefore, a maximum proportion of the recuperation power (in this case 20 kW) is supplied to the heater, and the remaining proportion of the recuperation power of 10 kW is supplied to the high-voltage battery.

In both disclosed embodiments, the power which is supplied to the heater is reduced after the recuperation mode, so that, on average, the actual power of the heater corresponds to the setpoint power of the heater. If the heater was supplied with 10 kW (instead of the setpoint power of 5 kW), for example, for 5 seconds in the recuperation phase, an energy of 25 kW too much was supplied to the heater. This 25 kW can then be saved by the heater not being supplied with power over 5 seconds for example.

If it is known on the basis of navigation data from a navigation system of the vehicle that relatively high loading of the energy store on account of a traction phase of the vehicle can be planned in the foreseeable future, the corresponding period of time in which the corresponding electrical consumer (in this case the heater) will not be supplied with power can be shifted to this traction phase.

If the sum of the maximum levels of power consumption by the energy sinks is lower than the recuperation power which is to be generated, the recuperation power is reduced to this sum of the maximum levels of power consumption and a, for example mechanical, brake system is connected to realize the braking power which is requested by the driver. If, in contrast, the available recuperation power is less than the sum of the maximum levels of power consumption by the energy sinks, the recuperation power is distributed to the energy sinks in accordance with the prioritization. In this case, it is nevertheless possible for not only the energy sinks which are provided with the highest priority to be supplied with recuperation power, but rather for a plurality of or all of the energy sinks to be supplied with recuperation power, with those energy sinks with the higher priority obtaining a higher proportion of the recuperation power.

According to the disclosed embodiments, it is also possible to use other energy sources instead of a generator as the energy source or recuperation source. An energy source of this kind can utilize, for example, waste heat (that is to say generate electrical power from waste heat, such as a thermoelectric generator for example). An internal combustion engine with a generator (as energy source) or the use of a low-voltage battery as energy store are also feasible. The energy consumers used can be a vacuum pump, a rear windscreen heater, a radiator fan, etc.

The disclosed embodiments may also use a heat store (for example PCM ("Phase Change Material") or latent heat store) as the energy store or in addition to the energy store, to directly store available energy for subsequent cycles of travel as heat to preheat the battery or the vehicle or the passenger compartment, for example at low temperatures before a journey is started.

FIG. 1 shows an overview of the principle of the disclosed embodiments.

As shown in block 3, the driver sets a deceleration energy, which is to be realized by the vehicle, by way of an accelerator/brake pedal, a recuperation power (recuperation energy) being produced from the deceleration energy. In addition to energy from further energy sources (for example utilization of waste heat by a thermoelectric generator), this recuperation power is provided to an energy distribution means 1 (that is to say a controller for distributing energy). This energy distribution means 1 is supplied with a prioritization of energy sinks 2 which can be calculated depending on the maximum power 7 of the respective energy sink (for example on the maximum heating power, maximum air-conditioning system power), on the setpoint power 6 which is set for the respective energy sink (for example setpoint power of the heater, of the air-conditioning system) and vehicle data (for example state of charge of the energy store, degree of efficiency of the respective energy sink).

The energy distribution means 1 decides which of the energy sinks present in block 4 will be supplied with the recuperation power which is to be distributed.

Figure 2:
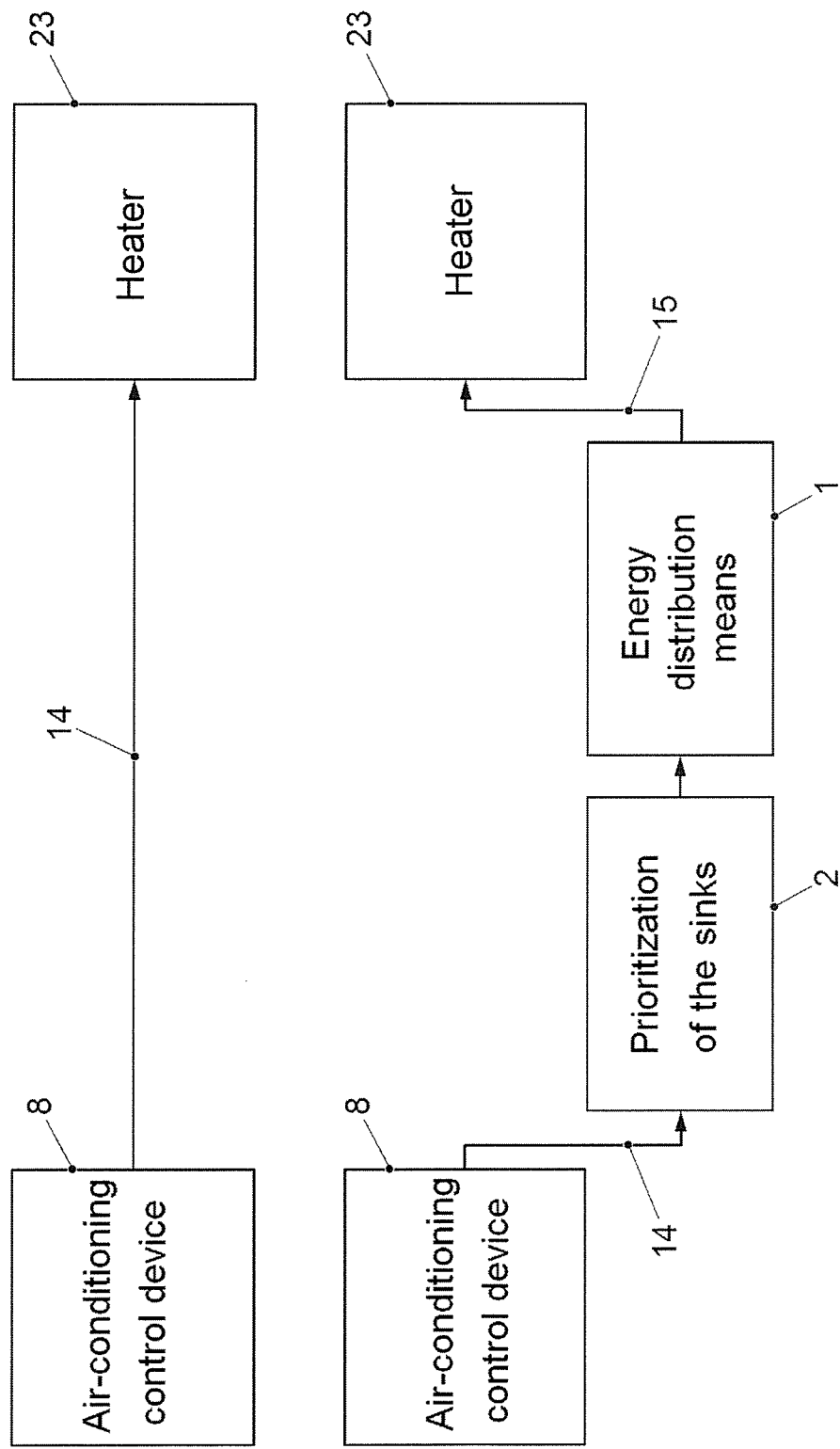
FIG. 2 shows the present invention on the basis of a comparison to the prior art.

FIG. 2 shows the difference between the disclosed embodiments and the prior art. According to the prior art, which is illustrated in the upper portion of FIG. 2, an air-conditioning control device 8 determines a setpoint heating power 14 with which a heater 23 of the vehicle 10 is intended to be supplied. The setpoint value which is supplied to the heater 23 is therefore independent of recuperation by the vehicle 10.

In contrast, within the scope of the present invention which is illustrated in the lower portion of FIG. 2, the setpoint heating power 14 which is prespecified by the air-conditioning control device 8 is changed by a superordinate control means, which is shown in FIG. 2 by blocks 1 and 2, depending on the recuperation. The superordinate control means reads the setpoint heating power 14, and the energy distribution means 1 therefore determines an adjusted setpoint heating power 15, with which the heater 13 is supplied with energy, depending on the prioritization of the energy sinks 2. In this case, the average time value of the adjusted setpoint heating power 15 corresponds to the average time value of the setpoint heating power 14.

It should be noted that the superordinate control means does not have to be an independent control device, but rather can be realized, for example, by the air-conditioning control device 8 or by another existing control device.

Figure 3:
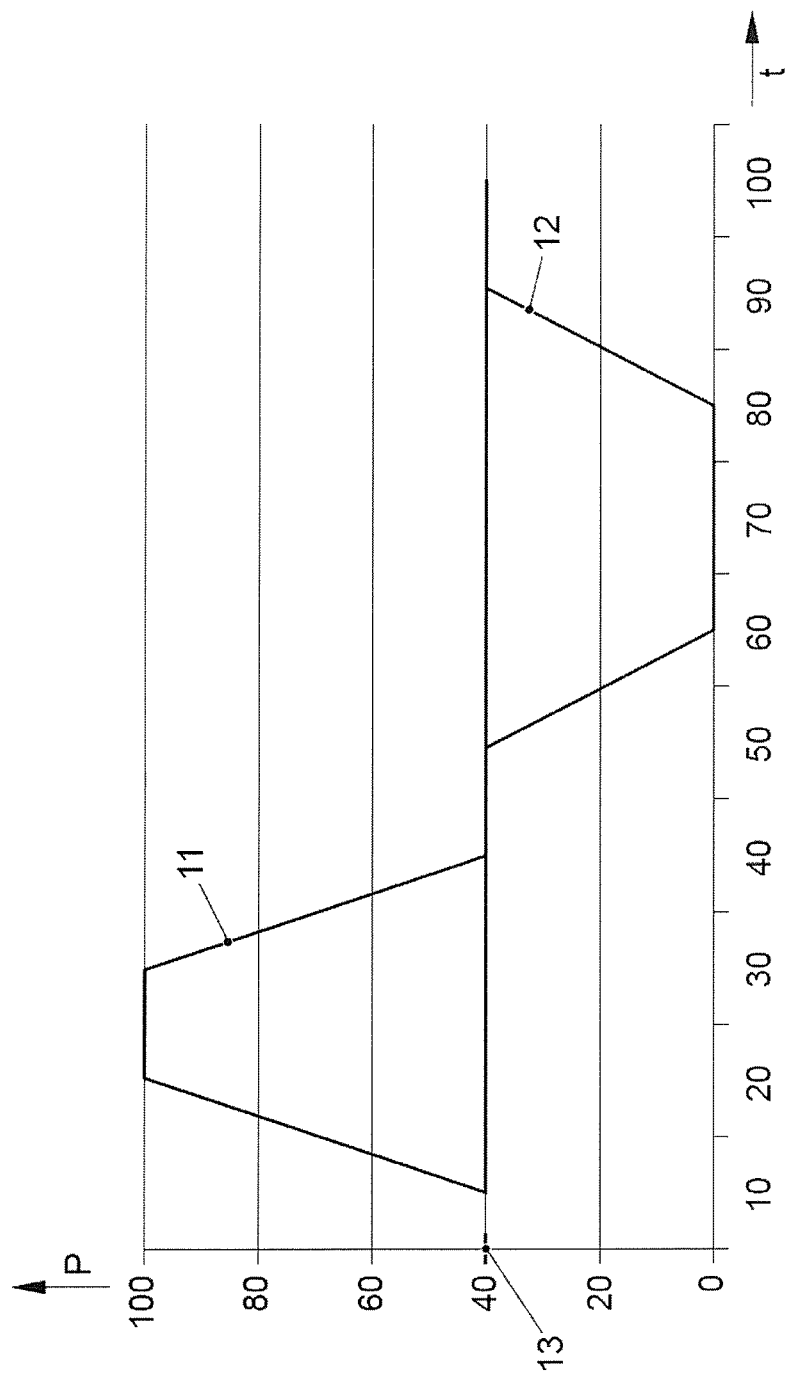
FIG. 3 shows how a consumer is first supplied with recuperation power and subsequently how the supplied power is reduced by a corresponding amount.

FIG. 3 shows the time profile of a power P which is supplied to the heater 23. During a recuperation mode 11, a power P which lies above the currently set setpoint power 13 of the heater 23 is supplied to the heater 23. To ensure that, on average, the actual power of the heater 23 corresponds to the setpoint power 13 of the heater 23, the actual power of the heater 23 is accordingly lowered during a subsequent traction phase 12 of the vehicle.

Figure 4:
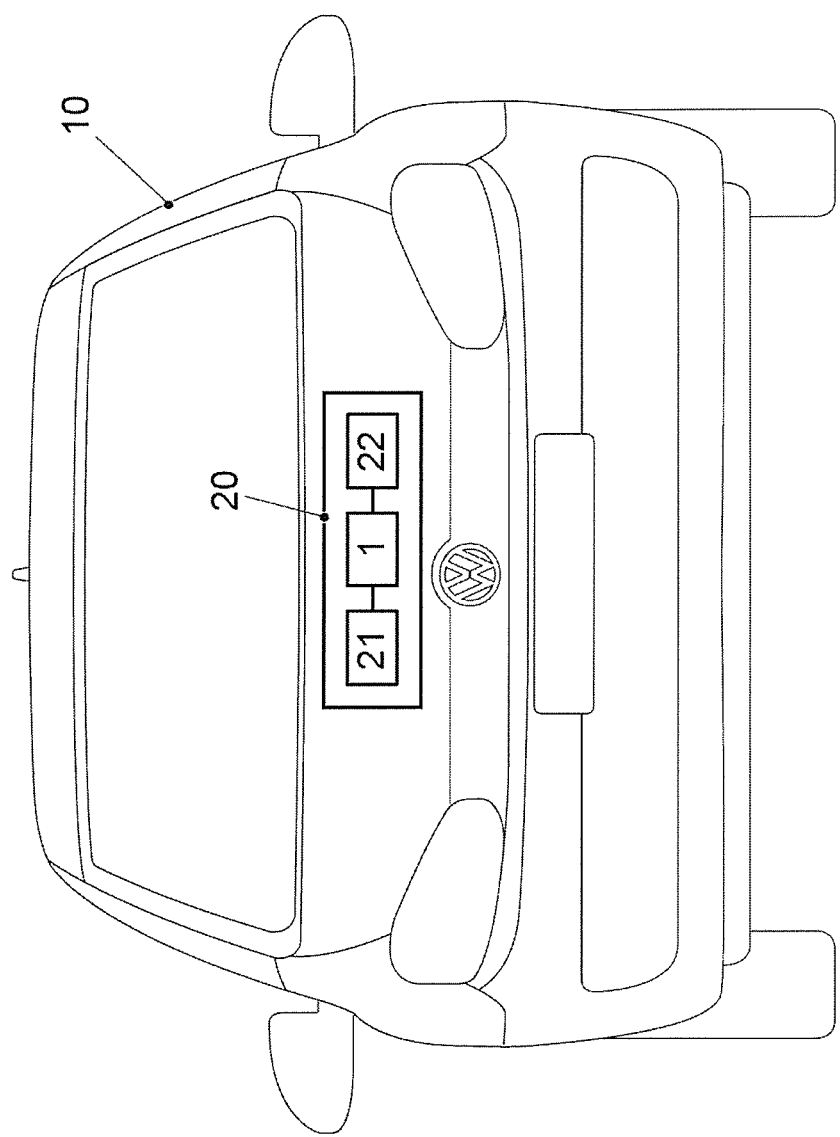
FIG. 4 schematically shows a vehicle comprising a system according to the disclosed embodiments.

FIG. 4 schematically shows a vehicle 10 according to the disclosed embodiments which comprises a system 20 according to the disclosed embodiments. In this case, the system 20 comprises, for its part, a control means 1 and also a high-voltage battery 21 and an air-conditioning system 22. In the recuperation mode, the control means 1 distributes the produced recuperation power to the high-voltage battery 21 and the air-conditioning system 22 in such a way that the average actual power of the air-conditioning system 22 corresponds to the setpoint power which is set for the air-conditioning system 22.

DE 10 2006 026 404 A1 describes a method for managing electrical energy in an on-board motor vehicle electrical system. In this case, if too much energy is generated in a recuperation mode, the energy consumption by electrical consumers can also be increased.

DE 10 2012 209 202 A1 discloses a method for heating a catalytic converter. In this case, an electric current which is generated by a regenerative brake system is directed to a catalytic converter to heat the catalytic converter.

DE 10 2012 004 008 A1 discloses that, during a braking process, recuperated electrical energy is fed to a compressor of a cooling circuit or to a braking resistor depending on an external temperature and a state of charge of an electrical energy store.

In electrical hybrid vehicles of the prior art, a recuperation power which is generated, for example, in the event of braking of the vehicle, is generally supplied only to one energy store. As a result, the possible recuperation power of the vehicle is reduced if, for example, the state of charge of the energy store is too high or other boundary conditions are present which prevent all of the recuperation power from being able to be supplied to the energy store.

Illustrative embodiments use the recuperation power of a vehicle in a more expedient manner than is the case in the prior art.

LIST OF REFERENCE SYMBOLS

1 Energy distribution means or control means
2 Prioritization
3 Energy sources
4 Energy sinks
5 Vehicle data
6 Setpoint energy sink power
7 Maximum energy sink power
8 Control device
10 Vehicle
11 Recuperation phase
12 Traction phase
13 Setpoint value for the heating power
14 Setpoint value
15 Adjusted setpoint value
20 System
21 High-voltage battery
22 Air-conditioning system
23 Heater
P Power
t Time

The invention claimed is:

1. A method for distributing recuperation power for a vehicle, the method comprising:
    determining the recuperation power;
    detecting a respective setpoint power of at least one energy consumer; and
    distributing the recuperation power to electrical energy sinks, the electrical energy sinks comprising an energy store and the at least one energy consumer,
    wherein the distribution is performed depending on the respective setpoint power of the at least one energy consumer, such that an average actual power of the at least one energy consumer corresponds to the respective setpoint power of the at least one energy consumer,
    wherein prioritization of the energy sinks is performed depending on one of the following items of information in order to distribute the recuperation power depending on the prioritization:
    an external temperature,
    system temperatures,
    a state of charge of the energy store, and
    a degree of efficiency exhibited by the respective energy sink when a power which is supplied to the respective energy sink is converted into another form of energy or when the supplied power is stored and output again.

2. The method of claim 1, wherein the at least one energy consumer is intermittently either not supplied with power at all or is supplied with a power which corresponds to a level of power consumption by the respective energy consumer which is optimized in respect of the degree of efficiency.

3. The method of claim 1, wherein a distance of travel which is intended to be covered by the vehicle in the future is determined; and the recuperation power is distributed to the consumers depending on the distance of travel.

4. The method of claim 1, wherein a charge current of the energy store is kept below a predetermined threshold value which lies below the maximum charge current of the energy store.

5. The method of claim 1, wherein the at least one energy consumer is supplied with power from the energy store if no recuperation power is available.

6. The method of claim 1, wherein a discharge current of the energy store is kept below a predetermined threshold value which lies below the maximum discharge current of the energy store.

7. The method of claim 1, wherein a temperature of the energy store is detected, and a power which is requested by a drive motor of the vehicle is detected, and a discharge current of the energy store is set higher than corresponds to the requested power if the temperature lies below a predetermined temperature threshold value.

8. A system for a vehicle,
    the system comprising:
        a control-controller; and
        a plurality of electrical energy sinks of the vehicle,
        wherein the energy sinks comprise an energy store and at least one energy consumer,
        wherein the control controller is designed to determine a recuperation power, to detect a respective setpoint power of the at least one energy consumer, and to distribute the recuperation power to the energy sinks depending on the respective setpoint power of the at least one energy consumer in such a way that an average actual power of the at least one energy consumer corresponds to the respective setpoint power of the at least one energy consumer;
    wherein prioritization of the energy sinks is performed depending on one of the following items of information in order to distribute the recuperation power depending on the prioritization:
    an external temperature,
    system temperatures,
    a state of charge of the energy store, and
    a degree of efficiency exhibited by the respective energy sink when a power which is supplied to the respective energy sink is converted into another form of energy or when the supplied power is stored and output again.

9. The system of claim 8, wherein the system carries out the method of claim 1.

* * * * *